(12) United States Patent
Blinick et al.

(10) Patent No.: US 7,870,417 B2
(45) Date of Patent: Jan. 11, 2011

(54) APPARATUS, SYSTEM, AND METHOD FOR ADAPTER CARD FAILOVER

(75) Inventors: Stephen L. Blinick, Tucson, AZ (US); Cheng-Chung Song, Tucson, AZ (US); Carol Spanel, San Jose, CA (US); Andrew Dale Walls, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 11/738,142

(22) Filed: Apr. 20, 2007

(65) Prior Publication Data

US 2008/0263255 A1 Oct. 23, 2008

(51) Int. Cl.
*G06F 11/00* (2006.01)

(52) U.S. Cl. .................. 714/4; 714/11; 714/8

(58) Field of Classification Search .......... 714/4, 714/8, 11
See application file for complete search history.

(56) References Cited

U.S. PATENT DOCUMENTS

| | | | |
|---|---|---|---|
| 5,329,634 A * | 7/1994 | Thompson | 710/8 |
| 6,003,075 A | 12/1999 | Arendt et al. | 709/221 |
| 6,263,374 B1 * | 7/2001 | Olnowich et al. | 709/253 |
| 6,529,978 B1 | 3/2003 | Eide et al. | 710/104 |
| 6,578,158 B1 | 6/2003 | Deitz et al. | |
| 6,609,213 B1 | 8/2003 | Nguyen et al. | |
| 6,845,467 B1 * | 1/2005 | Ditner et al. | 714/11 |
| 6,898,732 B1 | 5/2005 | Trehus et al. | |
| 6,931,568 B2 * | 8/2005 | Abbondanzio et al. | 714/11 |
| 6,971,044 B2 * | 11/2005 | Geng et al. | 714/11 |
| 7,039,922 B1 | 5/2006 | Shah et al. | 719/326 |
| 7,111,084 B2 | 9/2006 | Tan et al. | |
| 7,161,930 B1 * | 1/2007 | Wang et al. | 370/352 |
| 7,444,541 B2 | 10/2008 | Lubbers et al. | |
| 7,512,832 B1 | 3/2009 | Lent et al. | |
| 7,565,568 B1 * | 7/2009 | Kumar et al. | 714/5 |

(Continued)

FOREIGN PATENT DOCUMENTS

EP 1 675 006 A2 6/2006

OTHER PUBLICATIONS

PCT/EP2008/054722 International Search Report and Written Opinion, Nov. 11, 2008.

(Continued)

*Primary Examiner*—Scott T. Baderman
*Assistant Examiner*—Loan L. T. Truong
(74) *Attorney, Agent, or Firm*—Kunzler Needham Massey & Thorpe

(57) ABSTRACT

An apparatus, system, and method are disclosed for adapter card failover. A switch module connects a first processor complex to an adapter card through a first port as an owner processor complex. The owner processor complex manages the adapter card except for a second port and receives error messages from the adapter card. The switch module further connects a second processor complex to the adapter card through the second port as a non-owner processor complex. The non-owner processor complex manages the second port. A detection module detects a failure of the first processor complex. A setup module modifies the switch module to logically connect the second processor complex to the adapter card as the owner processor complex and to logically disconnect the first processor complex from the adapter card in response to detecting the failure.

26 Claims, 8 Drawing Sheets

U.S. PATENT DOCUMENTS

| | | |
|---|---|---|
| 7,646,708 B2 | 1/2010 | McGee et al. |
| 2003/0061220 A1* | 3/2003 | Ibrahim et al. ................. 707/10 |
| 2004/0166905 A1* | 8/2004 | Cherniski et al. ........ 455/575.1 |
| 2004/0193737 A1* | 9/2004 | Huffman et al. ................ 710/1 |
| 2005/0177770 A1 | 8/2005 | Coatney et al. ............... 714/15 |
| 2007/0025253 A1* | 2/2007 | Enstone et al. .............. 370/235 |
| 2007/0288585 A1* | 12/2007 | Sekiguchi et al. ........... 709/209 |
| 2008/0052504 A1* | 2/2008 | Tsuji et al. ..................... 713/1 |
| 2008/0082623 A1* | 4/2008 | Michael et al. .............. 709/214 |
| 2008/0162811 A1* | 7/2008 | Steinmetz et al. ........... 711/114 |
| 2008/0263255 A1* | 10/2008 | Blinick et al. ............... 710/314 |
| 2008/0263391 A1* | 10/2008 | Blinick et al. .................. 714/5 |

OTHER PUBLICATIONS

Bettstetter C. and Renner C., A Comparison of Service Discovery Protocols and Implementation of The Service Location Protocol, Sep. 13, 2009, XP002279616.

European Offical Communication for European Application 08 736 370.1, Feb. 18, 2010.

U.S. Appl. No. 11/738,150_FinalOfficeAction_Mar. 31, 2010.

* cited by examiner

APPARATUS, SYSTEM, AND METHOD FOR ADAPTER CARD FAILOVER

BACKGROUND OF THE INVENTION

1. Field of the Invention

This invention relates to adapter cards and more particularly relates to adapter card failover.

2. Description of the Related Art

A data processing system often includes a plurality of processor complexes. Each processor complex may include one or more microprocessors, cache memory, main memory, bridges to peripheral devices and buses, and the like. For example, a processor complex may communicate with a Peripheral Component Interconnect (PCI) bus through a north bridge and a south bridge. Adapter card peripheral devices such as network connections, storage devices, specialized compute engines, and the like may communicate with the processor complexes through the PCI bus.

Adapter cards typically comprise a plurality of semiconductor circuits mounted on a circuit board. An adapter card may connect to a bus through one or more connectors. Each adapter card may perform one or more specialized functions. For example, adapter cards may function as Ethernet controllers, Redundant Array of Independent Disks (RAID) controllers, and the like.

More than one processor complex of a data processing system may require access to an adapter card. For example, a cluster of two or more processor complexes may access a RAID controller adapter card in order to write data to and read data from hard disk drives in a fault-tolerant RAID subsystem. The adapter card communicating with two processor complexes may be referred to as a twin-tailed adapter card.

Although multiple processor complexes may access the adapter card, one processor complex controls the adapter card in terms of configuration and failure recovery. The processor complex controlling the adapter card is referred to herein as an owner processor complex. The owner processor complex may configure and manage the adapter card. Providing a single owner processor complex may prevent two or more processor complexes from attempting to configure and manage the adapter card.

Unfortunately, if the owner processor complex fails, other processor complexes may be unable to use the adapter card. As a result, the function of the data processor system may be degraded and/or impaired.

SUMMARY OF THE INVENTION

From the foregoing discussion, there is a need for an apparatus, system, and method for adapter card failover. Beneficially, such an apparatus, system, and method would transfer control of an adapter card from an original owner processor complex to allow the continued use of the adapter card.

The present invention has been developed in response to the present state of the art, and in particular, in response to the problems and needs in the art that have not yet been fully solved by currently available adapter card failover methods. Accordingly, the present invention has been developed to provide an apparatus, system, and method for adapter card failover that overcome many or all of the above-discussed shortcomings in the art.

The apparatus for adapter card failover is provided with a plurality of modules configured to functionally execute the steps of connecting a first processor complex, connecting a second processor complex, detecting a failure, and modifying a switch module. These modules in the described embodiments include a switch module, a detection module, and a setup module.

The switch module includes semiconductor logic and logically connects a first processor complex to an adapter card through a first port as an owner processor complex. The owner processor complex manages the adapter card except for a second port and receives error messages from the adapter card. The switch module further logically connects a second processor complex to the adapter card through the second port as a non-owner processor complex. The non-owner processor complex manages the second port.

The detection module includes semiconductor logic and software instructions executing on a processor. In addition, the detection module detects a failure of the first processor complex.

The setup module modifies the switch module to logically connect the second processor complex to the adapter card as the owner processor complex and to logically disconnect the first processor complex from the adapter card in response to detecting the failure. The setup module includes software instructions executing on a processor. The apparatus performs a failover from the first processor complex to the second processor complex if the first processor complex fails.

A system of the present invention is also presented for adapter card failover. The system may be embodied in a data processing system. In particular, the system, in one embodiment, includes a first processor complex, a second processor complex, and an adapter card.

The first and second processor complexes are in communication with the adapter card. The second processor complex includes a setup module. The adapter card includes a controller, a first memory module, and a switch module.

The controller manages the adapter card. The first memory module stores a control store comprising software instructions and setup data for the controller. The switch module includes semiconductor logic and logically connects the first processor complex to the adapter card through a first port as an owner processor complex. The owner processor complex manages the adapter card except for a second port and receives error messages from the adapter card. The switch module further logically connects a second processor complex to the adapter card through the second port as a non-owner processor complex. The non-owner processor complex manages the second port.

The setup module modifies the switch module to logically connect the second processor complex to the adapter card as the owner processor complex and to logically disconnect the first processor complex from the adapter card in response to detecting the failure. The system fails over from the first processor complex owning the adapter card to the second processor complex owning the adapter card in response to the failure.

A method of the present invention is also presented for adapter card failover. The method in the disclosed embodiments substantially includes the steps to carry out the functions presented above with respect to the operation of the described apparatus and system. In one embodiment, the method includes connecting a first processor complex, connecting a second processor complex, detecting a failure, and modifying a switch module.

A switch module connects a first processor complex to an adapter card through a first port as an owner processor complex. The owner processor complex manages the adapter card except for a second port and receives error messages from the adapter card. The switch module further connects a second processor complex to the adapter card through the second port as a non-owner processor complex. The non-owner processor complex manages the second port.

A detection module detects a failure of the first processor complex. A setup module modifies the switch module to logically connect the second processor complex to the adapter card as the owner processor complex and to logically disconnect the first processor complex from the adapter card in response to detecting the failure. The method performs a failover from the first processor complex to the second processor complex so that the adapter card continues to be useable.

References throughout this specification to features, advantages, or similar language do not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

The embodiment of the present invention performs a failover from a first processor complex that owns an adapter card to a second processor complex. The present invention supports the continued use of the adapter card when the first processor complex fails. These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays (FPGA), programmable array logic, programmable logic devices or the like.

Modules may also be implemented in software for execution by various types of processors. An identified module of executable code may, for instance, comprise one or more physical or logical blocks of processor instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within the modules, and may be embodied in any suitable form and organized within any suitable type of data structure. The operational data may be collected as a single data set, or may be distributed over different locations including different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
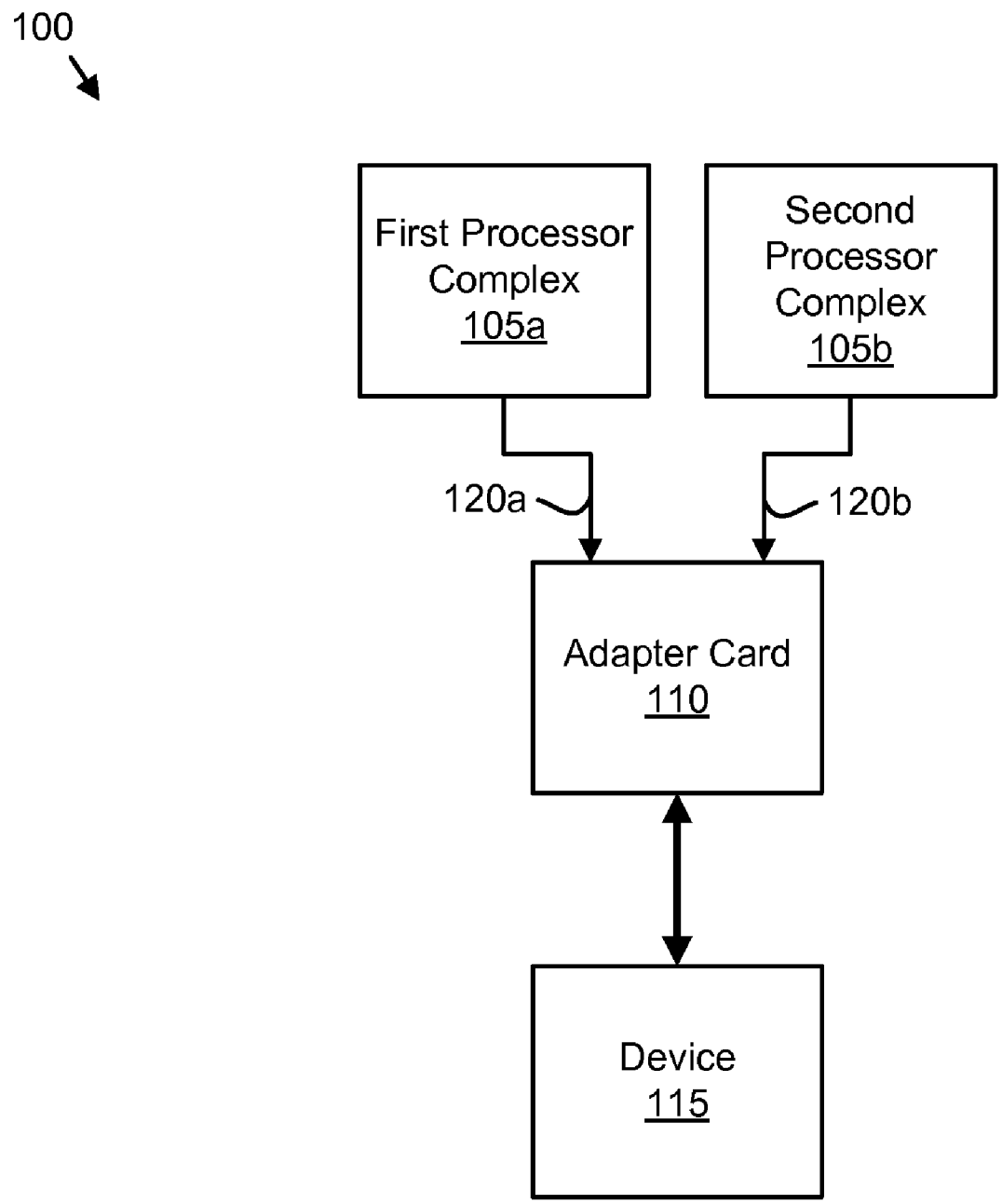
FIG. 1 is a schematic block diagram illustrating one embodiment of a data processing system in accordance with the present invention.

FIG. 1 is a schematic block diagram illustrating one embodiment of a data processing system 100 in accordance with the present invention. The data processing system 100 includes one or more processor complexes 105, and an adapter card 110. Although for simplicity, two processor complexes 105 are shown, any number of processor complexes 105 may be employed.

The first and second processor complexes 105a-b, communicate with the adapter card 110 over one or more communications channels 120. In one embodiment, the communication channels 120 are configured as a Peripheral Component Interconnect Express (PCIe) bus. Alternatively, the communication channels 120 may be configured as a Peripheral Component Interconnect Extended (PCI-X) bus or a Peripheral Component Interconnect (PCI) bus. One of skill in the art will recognize that the present invention may be practiced with a plurality of communication channel configurations.

The adapter card 110 performs one or more functions for the first and second processor complexes 105a-b. For example, the adapter card 110 may function as an Ethernet controller. Alternatively, the adapter card 110 may function as a RAID controller. In a certain embodiment, the adapter card 110 functions as storage area network controller. One of skill in the art will recognize that the present invention may be practiced with a plurality of adapter card types and functions.

The first processor complex 105a is initially configured as the owner processor complex. The owner processor complex initializes, controls, and manages the adapter card 110. For example, during a power-on boot, the first processor complex 105a as owner processor complex may discover and initialize the adapter card 110 as will be described hereafter.

The second processor complex 105b is initially configured as a non-owner processor complex. Although for simplicity only one non-owner processor complex is described, the data processing system may include a plurality of non-owner processor complexes. A non-owner processor complex may also use the adapter card 110. For example, a non-owner processor complex may employ a RAID controller adapter card 110 to access a RAID subsystem. However, non-owner processor complexes do not initialize, manage, and/or control the adapter card 110.

The adapter card 110 may communicate with a device 115. The device may be a network interface, a RAID subsystem, a storage device, and the like. During initialization, the owner processor complex may also discover and initialize the device 115. Non-owner processor complexes may be unable to discover the device 115 during initialization as will be described hereafter.

If the first processor complex 105a fails, the adapter card 110 may be unusable by the second processor complex 105b. As a result, the data processing system 100 may lose critical functionality. The present invention performs a fail over of ownership of the adapter card 110 from the first processor complex 105a to the second processor complex 105b to support the continued use of the adapter card 110 as will be described hereafter.

Figure 2:
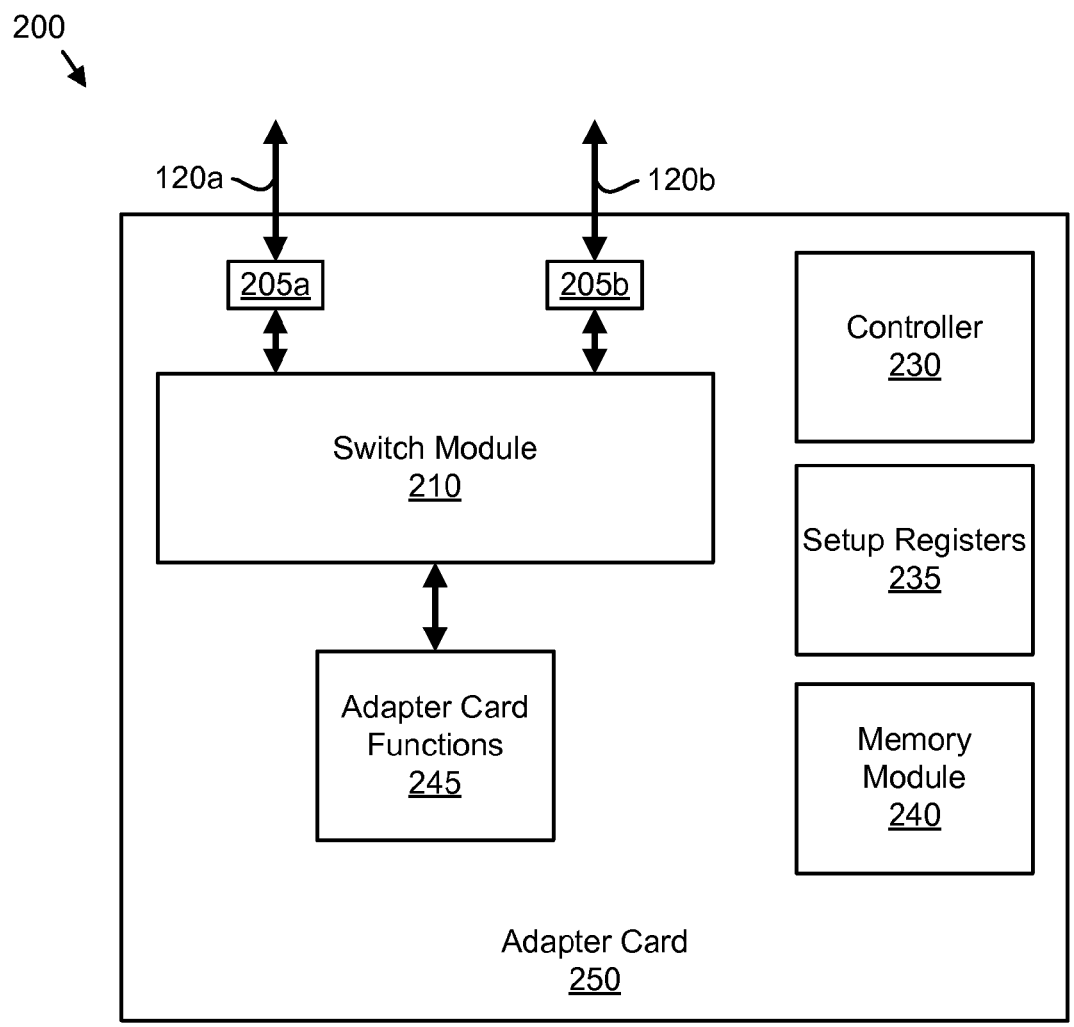
FIG. 2 is a schematic block diagram illustrating one embodiment of an adapter card of the present invention.

FIG. 2 is a schematic block diagram illustrating one embodiment of an adapter card 250 of the present invention. The adapter card 250 is one embodiment of the adapter card 110 of FIG. 1. The description of the adapter card 250 refers to elements of FIG. 1, like numbers referring to like elements.

The adapter card 250 includes one or more ports 205, a switch module 210, a controller 230, setup registers 235, a memory module 240, and adapter card functions 245. One of skill in the art will recognize that the present invention may be practiced with additional ports 205, switch modules 210, controllers 230, setup registers 235, memory modules 240, and adapter card functions 245, as well as other devices and modules.

The ports 205 may be configured as PCI interfaces, PCIe interfaces, PCI-X interfaces, and the like. The first processor complex 105a may communicate with a first port 205a while the second processor complex 105b may communicate with a second port 205b.

The switch module 210 logically and physically connects the first processor complex 105a to the adapter card 110 through the first port 205a as the owner processor complex. The owner processor complex manages the adapter card 110, except for the second port 205b. In addition, the owner processor complex receives error messages from the adapter card 110.

The switch module 210 further logically and physically connects the second processor complex 105b to the adapter card 110 through the second port 205b as a non-owner processor complex. The non-owner processor complex manages the second port 205b.

The adapter card functions 245 may include communication functions such as an Ethernet controller function, a token ring controller function, and the like. The adapter card functions 245 may also include storage management functions such as a RAID controller function, a storage controller function, and the like.

The controller 230 manages the adapter card 110. For example, the controller 230 may initialize and manage the adapter card functions 245. The memory module 240 stores a control store comprising software instructions and setup data for the controller 230. The controller 230 may include a processor, instruction sequencer, and the like that executes the software instructions. The software instructions may be configured as one or more processor program products.

The setup registers 235 store binary data values. The function of the switch module 210, adapter card functions 245, controller 230, and memory module 240 may be modified by the data values stored in the setup registers 235. For example, a value stored in the setup registers 235 may cause the switch module 210 to configure a processor complex 105 connected to the first port 205a as the owner processor complex and to configure a processor complex connected to the second port 205b as a non-owner processor complex.

Figure 3:
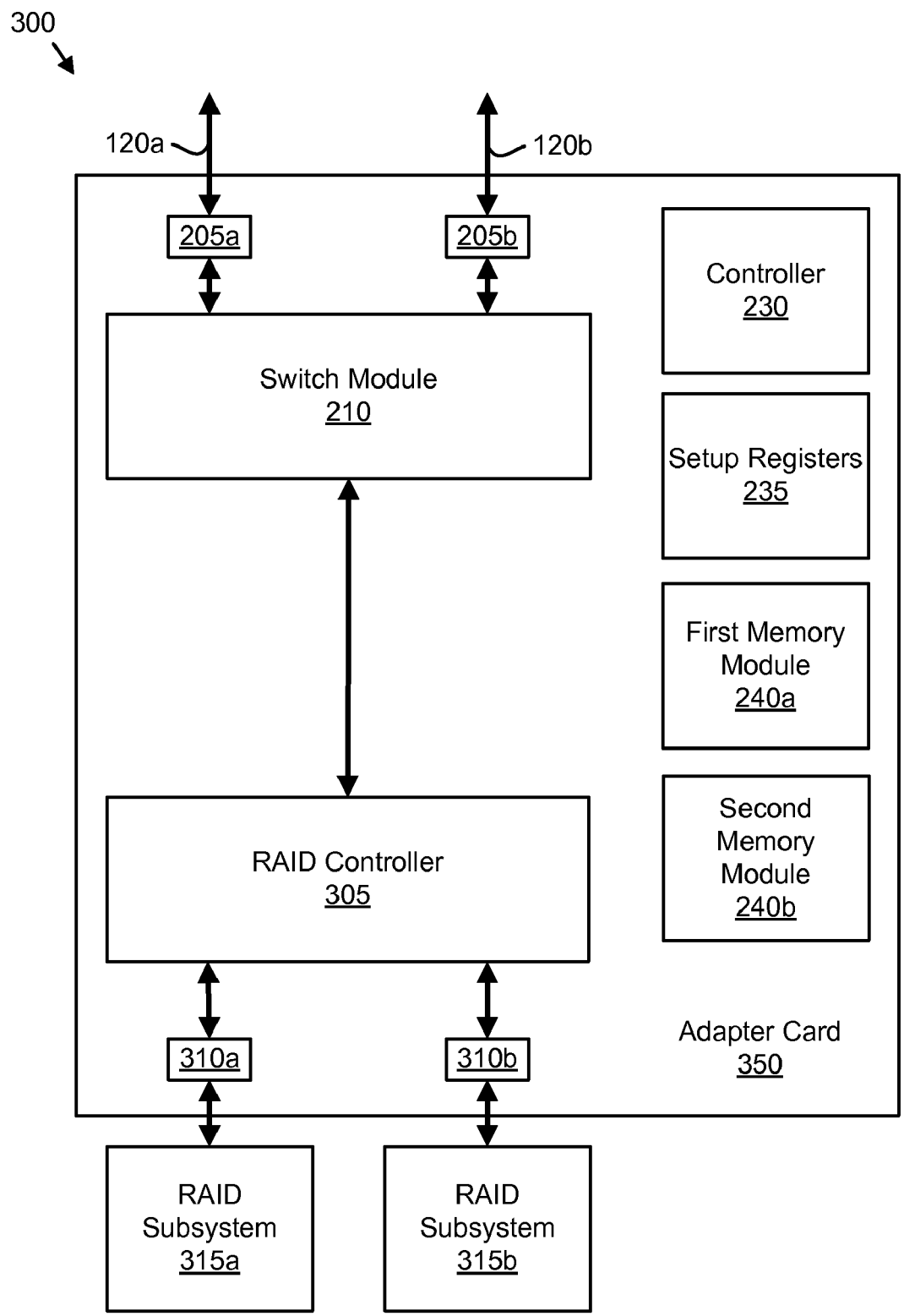
FIG. 3 is a schematic block diagram illustrating one alternate embodiment of an adapter card of the present invention.

FIG. 3 is a schematic block diagram illustrating one alternate embodiment of an adapter card 350 of the present invention. The adapter card 350 is an alternate embodiment of the adapter card 110 of FIG. 1. The description of the adapter card 250 refers to elements of FIGS. 1-2, like numbers referring to like elements. Specifically, the ports 205, switch module 210, controller 230, and setup registers 235 are the ports 205, switch module 210, controller 230, and setup registers 235 of FIG. 2.

The adapter card 350 further includes a first and second memory module 240a-b. The first memory module 240a stores a first control store comprising software instructions and setup data for the controller 230. In one embodiment, the first control store configures the switch module 210 and the controller 230 to treat the processor complex 105 in communication with the first port 205a as the owner processor complex and to treat the processor complex 105 in communication with the second port 205b as a non-owner processor complex.

The second memory module 240b stores a second control store that also comprises software instructions and setup data for the controller 230. In one embodiment, the second control store configures the switch module 210 and the controller 230 to treat the processor complex 105 in communication with the second port 205b as the owner processor complex and to treat the processor complex 105 in communication with the first port 205a as a non-owner processor complex.

In one embodiment, the first and second memory modules 240a-b each share a binary address bus and a binary data bus.

A first binary value stored in the setup registers 235 may enable the first memory module 240a and disable the second memory module 240b so that only the first memory module 240a outputs data on the binary data bus. An opposite second binary value stored in the setup registers 235 may disable the first memory module 240a and enable the second memory module 240b to output data on the binary data bus. Thus, a control store used by the controller 230 may be selected using a value written to the setup registers 235.

The adapter card 350 further includes a RAID controller 305 and a first and second downstream port 310a-b. The first and second downstream ports 310a-b communicate with first and second RAID subsystems 315a-b respectively. The RAID controller 305, downstream ports 310, and RAID subsystems 315 are exemplary of functionality that may be supported by the adapter card 350 and are not shown by way of limitation.

In one embodiment, the first and second processor complexes 105a-b may each access the RAID subsystems 315 using the RAID controller 305 of the adapter card 350. The RAID controller 305 and switch module 210 may arbitrate priority between the first and second processor complexes 105, so that each processor complex 105 may access the RAID subsystems 315. The RAID controller 305 may further autonomously perform one or more RAID controller functions, such as calculating parity stripe data, recovering lost data from redundant data, and the like.

Figure 4:
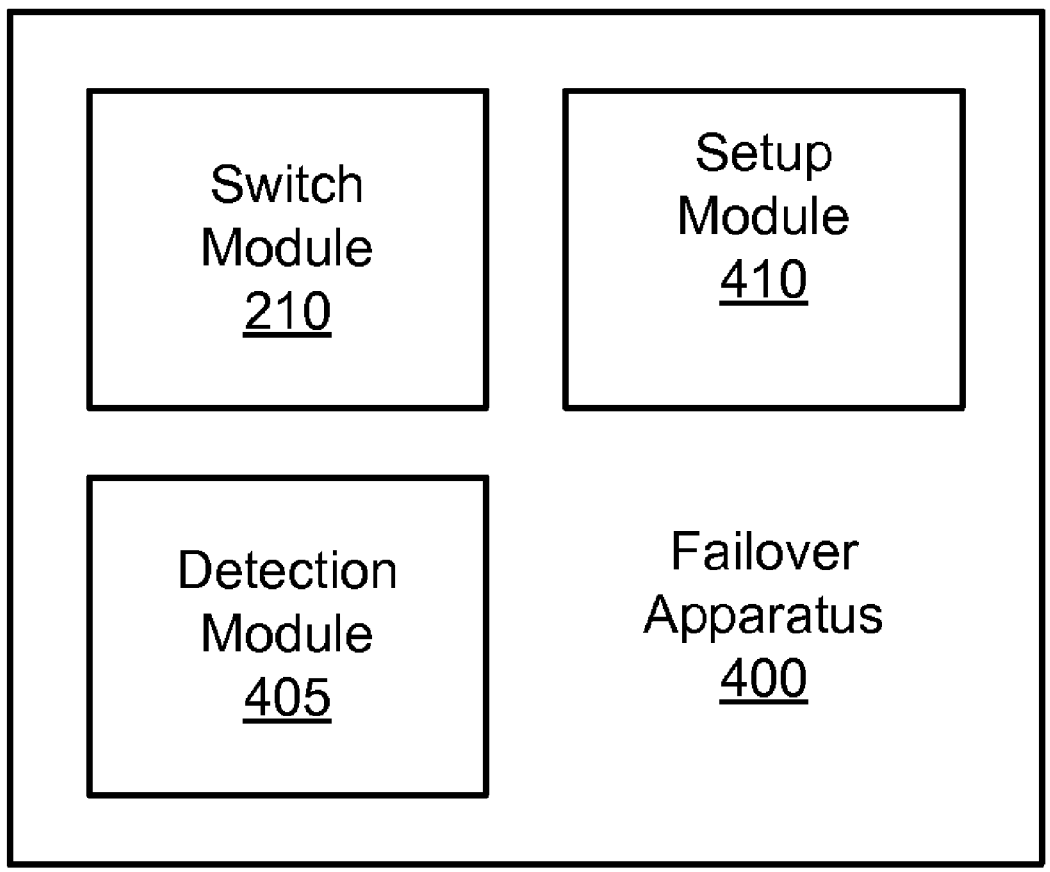
FIG. 4 is a schematic block diagram illustrating one embodiment of a failover apparatus of the present invention.

FIG. 4 is a schematic block diagram illustrating one embodiment of a failover apparatus 400 of the present invention. The apparatus 400 may be embodied in one or more processor complexes 105 of FIG. 1 and the adapter cards 110, 250, 350 of FIGS. 1-3. The description of the apparatus 400 refers to elements of FIGS. 1-3, like numbers referring to like elements. The apparatus 400 includes the switch module 210, a detection module 405, and a setup module 410.

The switch module 210 includes semiconductor logic as is well known to those of skilled in the art. In addition, the switch module 210 may include a crossbar switch, a non-blocking point-to-point switch, and the like. In one embodiment, the switch module 210 may connect the first port 205a and the second port 205b to one or more semiconductor devices of the adapter card 110.

The detection module 405 includes semiconductor logic and software instructions executing on a processor such as the second processor complex 105b and/or the controller processor. In addition, the detection module 405 detects a failure of the first processor complex 105a as will be described hereafter.

The setup module 410 modifies the switch module 210 to connect the second processor complex 105b to the adapter card 110 as the owner processor complex and to logically disconnect the first processor complex 105a from the adapter card in response to detecting the failure. The setup module 410 includes software instructions executing on a processor such as the second processor complex 105b and/or the controller processor. The apparatus performs a failover from the first processor complex to the second processor complex.

The schematic flow chart diagram that follows is generally set forth as a logical flow chart diagram. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
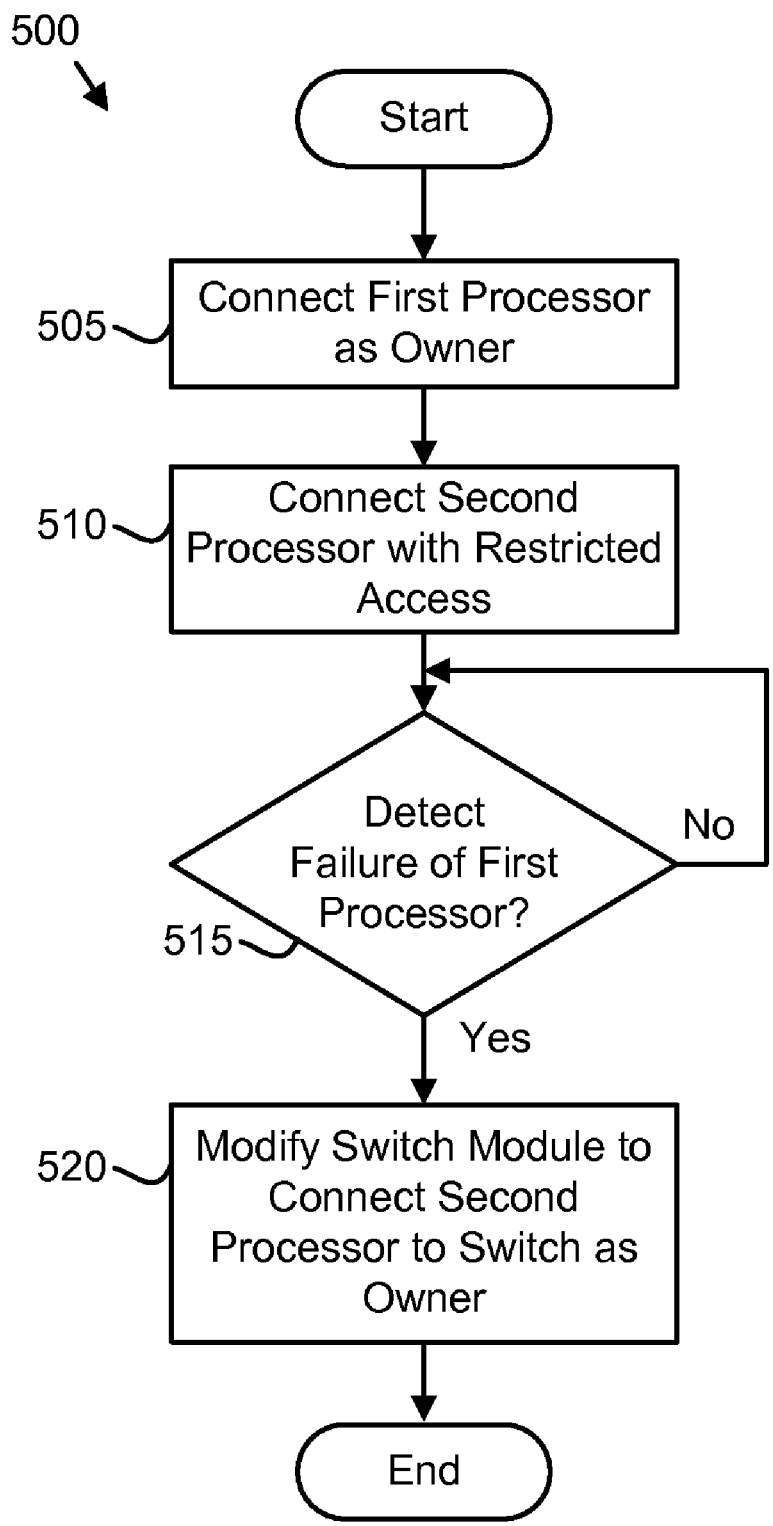
FIG. 5 is a schematic flow chart diagram illustrating one embodiment of a failover method of the present invention.

FIG. 5 is a schematic flow chart diagram illustrating one embodiment of a failover method 500 of the present invention. The method 500 substantially includes the steps to carry out the functions presented above with respect to the operation of the described apparatus and system of FIGS. 1-4. In one embodiment, the method is implemented with a processor program product comprising a processor readable medium having a processor readable program. The processor readable program may be integrated into a semiconductor device, such as the controller 230 and/or processor complex 105, wherein the program in combination with the controller 230 and/or processor complex 105 are capable of performing the method 500.

The method 500 begins and the switch module 210 connects 505 the first processor complex 105a to the adapter card 110 through the first port 205a as an owner processor complex. The owner processor complex manages the adapter card 110 except for the second port 205b and receives error messages from the adapter card 110. For example, the owner processor complex may initialize the adapter card 110 during a power-on boot as will be described hereafter. The owner processor complex may also communicate directly with the controller 230. In another example, if the adapter card 110 is configured as a RAID controller adapter card 350 and the RAID controller adapter card 350 detected a hard disk drive failure in a RAID subsystem 315, the RAID controller adapter card 350 may communicate an error message describing the failure to the owner processor complex.

The switch module 210 further connects 510 the second processor complex 105b to the adapter card 110 through the second port 205b as a non-owner processor complex. The non-owner processor complex does not initialize the adapter card 110. In addition, the non-owner processor complex may not receive error messages, status messages, and the like from the adapter card 110. Continuing the example above, if the RAID controller adapter card 350 experiences a hard disk drive failure, the RAID controller adapter card 350 does not communicate an error message to the non-owner processor complex.

The non-owner processor complex manages the second port 205b. In one embodiment, only the non-owner processor complex communicates with the second port 205b. Alternatively, the non-owner processor complex may set a data transfer rate for the second port 205b, direct the second port 205b to communicate data, and the like.

The detection module 405 detects 515a failure of the first processor complex. 105a. In one embodiment, the detection module 405 is configured as a processor program product comprising software instructions executing on the second processor complex 105b. The detection module 405 may periodically communicate with the first processor complex 105a. If the detection module 405 is unable to communicate with the first processor complex 105a during a specified interval, the detection module 405 may detect 515 the failure of the first processor complex. 105a.

In an alternate embodiment, a multi-node operating system executing on and managing the first and second processor complexes 105a-b may detect the failure of the first processor complex 105a. The multi-node operating system may communicate an error message to the detection module 405 in response to a failure of the first processor complex 105a and the detection module 405 may detect 515 the failure of the first processor complex 105a from the error message.

In a certain embodiment, the detection module 405 is configured as semiconductor logic coupled with a processor program product executing on a processor of the controller 230. The detection module 405 may detect 515 the failure of the first processor complex 105a if the first processor complex 105a does not communicate with adapter card 110 during a specified time interval. For example, if the first processor complex 105a does not communicate with the adapter card 110 during a two (2) minute time interval, the detection module 405 may query the first processor complex 105a. If the first processor complex 105a does not respond, the detection module 104 may detect 515 the failure of the first processor complex 105a.

The setup module 410 modifies 520 the switch module 210 to logically connect the second processor complex 105b to the adapter card 110 as the owner processor complex in response to detecting the failure. In one embodiment, the setup module 410 comprises a processor program product executing on the second processor complex 105b. In response to the detection module 405 detecting 515 the failure of the first processor complex 105a, the setup module 410 may communicate a specified binary values to the second port 205b of the adapter card 110. The specified binary values may direct the controller 230 to accept commands from a non-owner processor complex. The second processor complex 105b may then write binary values to the setup registers 235 that designate the processor complex 105 in communication with the second port 205b as the owner processor complex.

In an alternate embodiment, the setup module 410 executing on the second processor complex 105b writes binary values to the setup registers 235 that cause the controller 230 to employ the second control store of the second memory module 240b. The setup module 410 may further re-initialize the adapter card 110 so that the controller 230 loads and executes the second control store.

In one embodiment, the setup module 410 comprises semiconductor logic and/or one or more processor program product executing on the processor of the controller 230. The setup module 410 may modify write binary values to the setup registers 235 that cause the switch module 210 to treat the processor complex 105 in communication with the second port 205b as the owner processor complex. In addition, the setup module 410 may communicate a message to the second processor complex 105b requesting that the second processor complex 105b assume the tasks of the owner processor complex.

The setup module 410 may further logically disconnect the first processor complex 105a from the adapter card 110 in response to detecting the failure. In one embodiment, the setup module 410 writes a binary value to the setup registers 235 that causes the switch module 210 to stop receiving communications through the first port 205a. In a certain embodiment, the setup module 410 communicates a message to a system administrator requesting that the first processor complex 105a be physically disconnected from the data processing system 100.

By detecting 515 the failure of the first processor complex 105a and modifying 520 the switch module 210 to connect to the second processor complex 105b as the owner processor complex, the present invention supports rapid failover from the first to second processor complex 105b when the first processor complex 105a fails. As a result, one or more processor complexes 105 may continue to use the adapter card 110.

Figure 6:
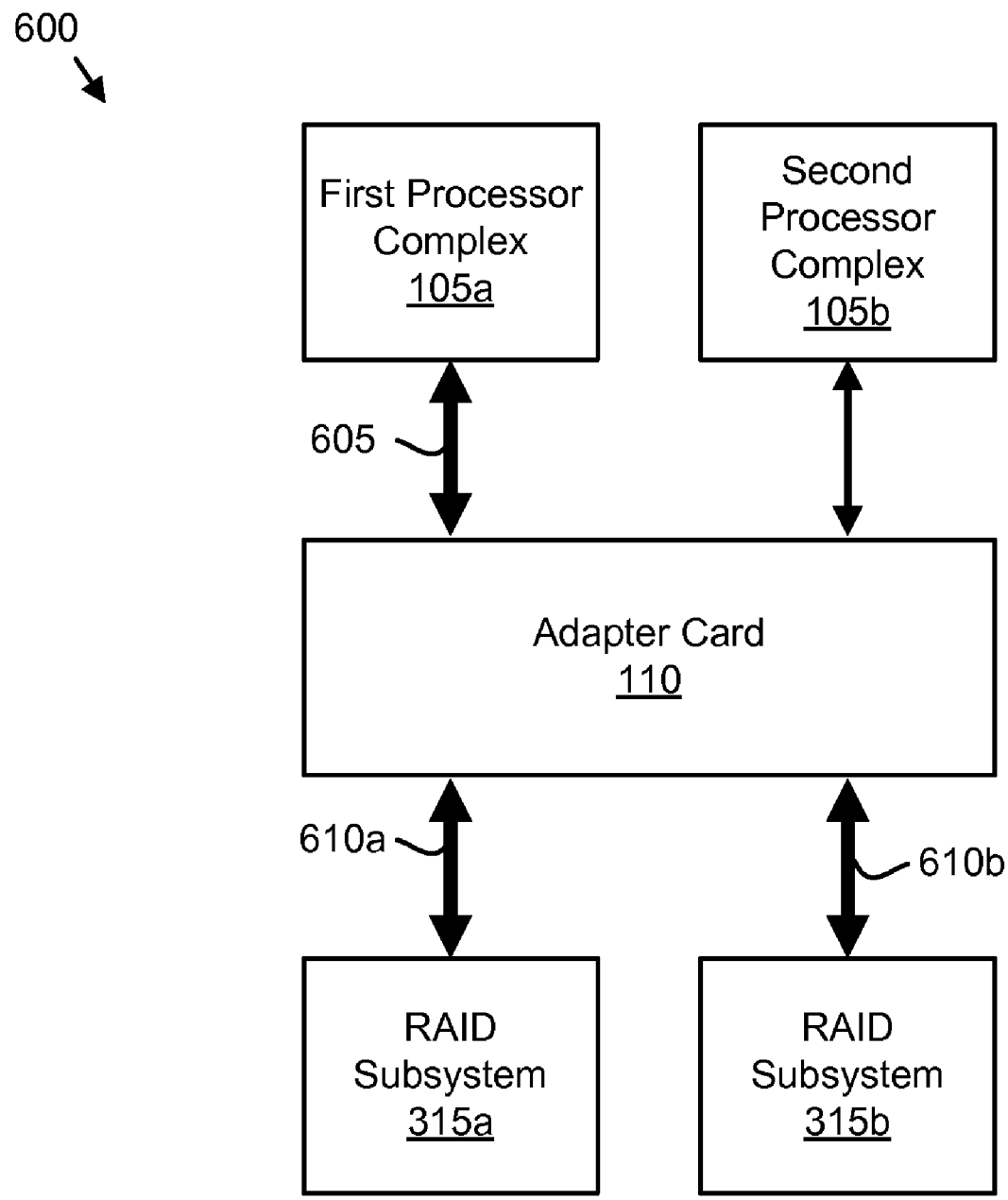
FIG. 6 is a schematic block diagram illustrating one embodiment of adapter card communications of the present invention.

FIG. 6 is a schematic block diagram illustrating one embodiment of adapter card communications 600 of the present invention. The description of the communications 600 refers to elements of FIGS. 1-5, like numbers referring to like elements. The communications 600 include logical representations of the first processor complex 105a, the second processor complex 105b, the adapter card 110, and the RAID subsystems 315.

The communications 600 show the first processor complex 105a as the owner processor complex. During an initialization such as an initialization of a power-on boot, a soft reset, and the like, the first processor complex 105a communicates a discovery communication with one or more devices that are connected to the communication channel 120. For example, if the communication channel 120 is a PCIe bus, the first processor complex 105a communicates a discovery request to each device such as the adapter card 110 connected to the PCIe bus. The adapter card 110 may respond to the discovery request with an identification response that identifies the adapter card 110. The discovery request and identification response are shown as an owner communication 605. The switch module 210 only supports owner communication 605 between the owner processor complex first processor complex 605 and the adapter card 10.

Because the switch module 210 supports discovery communication 605 with the first processor complex 105a, the first processor complex 105a may initialize the adapter card 110 and direct the adapter card 110 to communicate error messages, status messages, and the like to the first processor complex 105a. The first processor complex 105a may also communicate directly with the controller 230. The second processor complex 105b is unable to initialize the adapter card 110.

The first processor complex 105b may also communicate discovery communications 610 through the adapter card 110 to devices such as the depicted RAID subsystems 315. Thus the first processor complex 105a may also initialize the RAID subsystems 315. In contrast, the second processor complex 105b sees the adapter card 110 as an end point. Thus the second processor complex 105b does not see or attempt to initialize devices such as the RAID subsystems 315.

Figure 7:
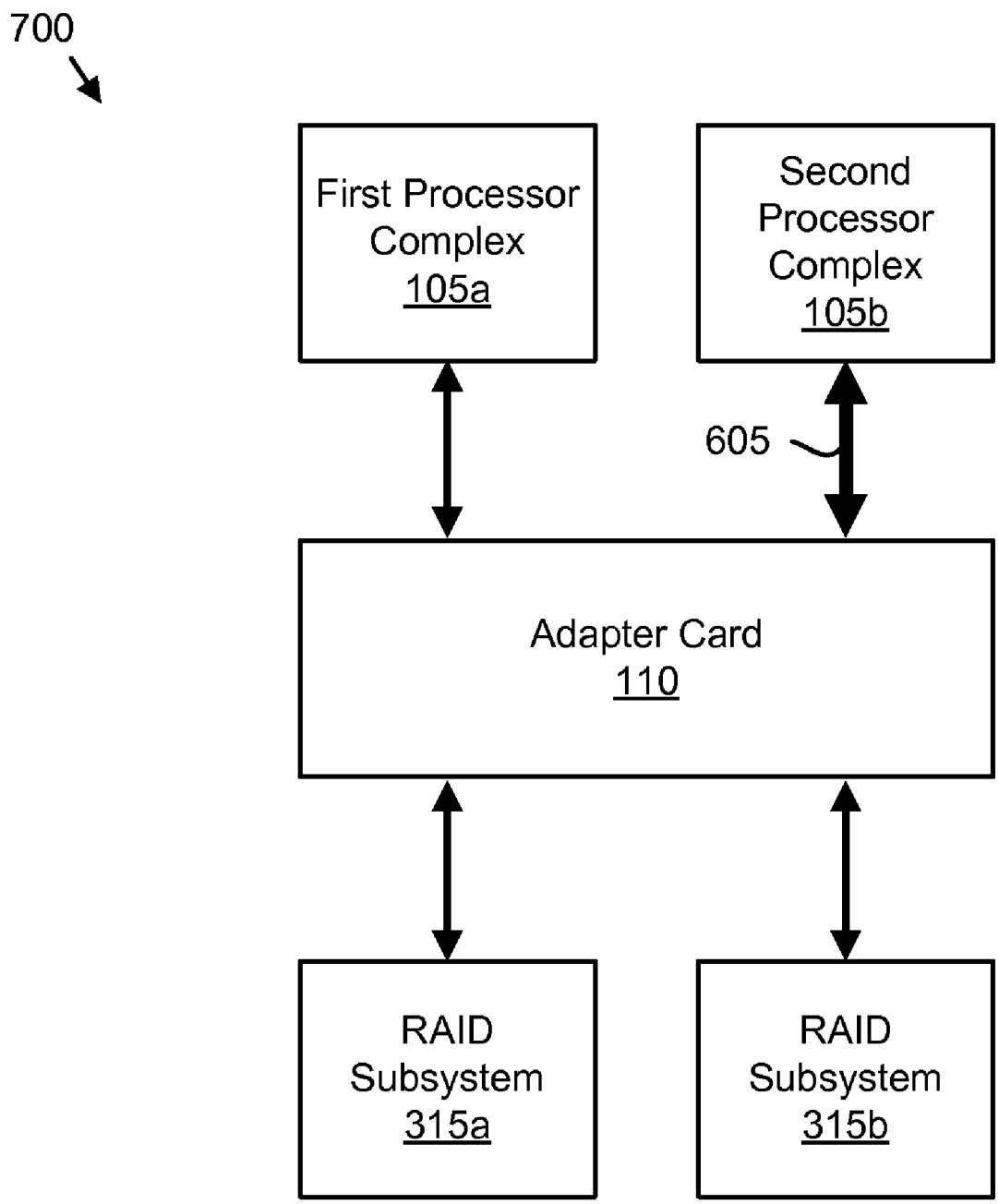
FIG. 7 is a schematic block diagram illustrating one alternate embodiment of adapter card communications of the present invention.

FIG. 7 is a schematic block diagram illustrating one alternate embodiment of adapter card communications 700 of the present invention. The communications 700 show the logical representations of the first processor complex 105a, the second processor complex 105b, the adapter card 110, and the RAID subsystems 115 of FIG. 6.

As depicted, after the setup module 410 modifies 520 the switch module 210 to logically connect the second processor complex 105b to the adapter card 110 as the owner processor complex, the second processor complex 105b has owner communications 605 with the adapter card 110. Thus the second processor complex may initialize the adapter card 110, receive error messages from the adapter cards 110, and the like. The setup module 410 may also logically disconnect the first processor complex 105a.

Figure 8:
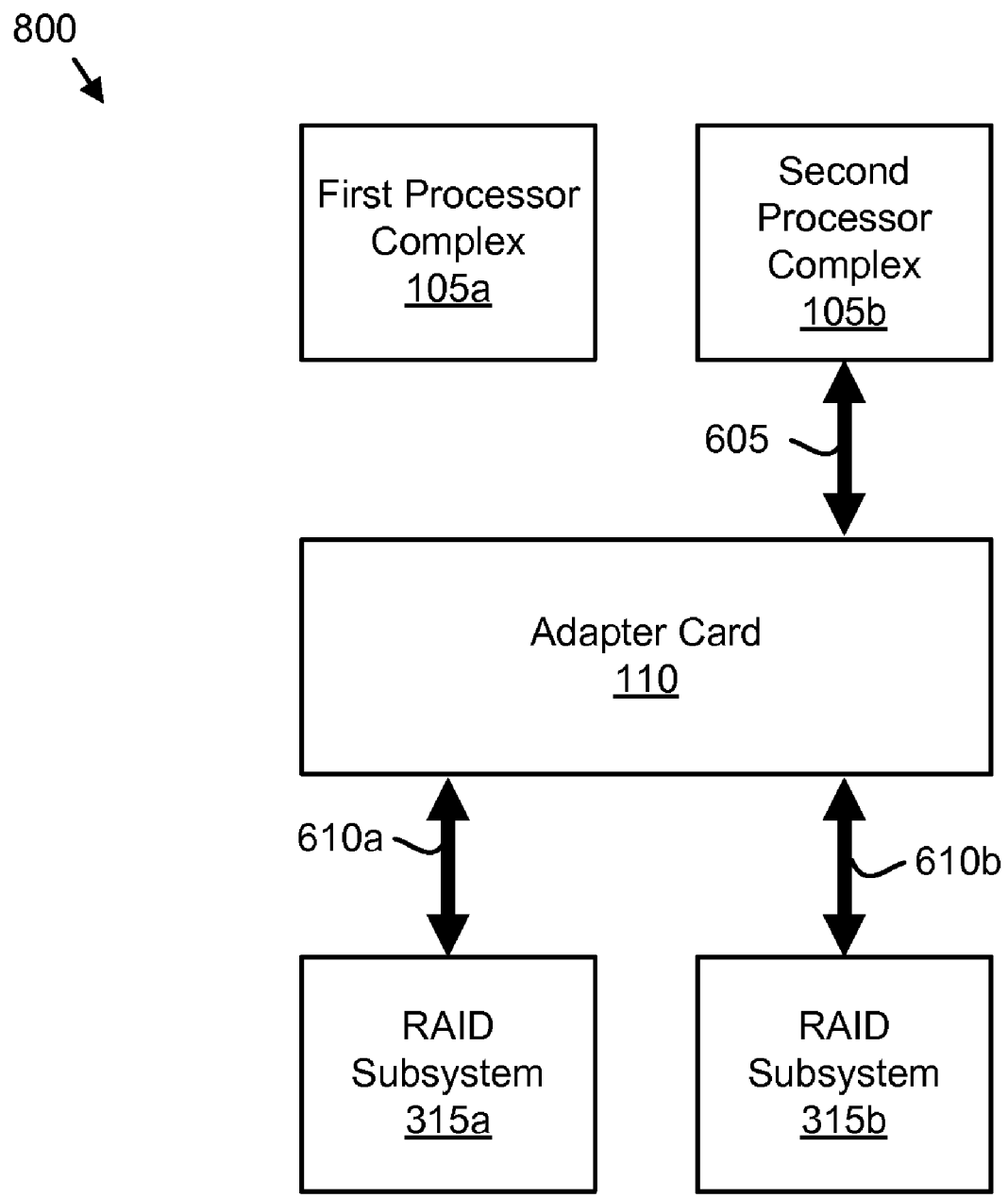
FIG. 8 is a schematic block diagram illustrating one embodiment of failover communications of the present invention.

FIG. 8 is a schematic block diagram illustrating one embodiment of failover communications 800 of the present invention. The communications 800 show the logical representations of the first processor complex 105a, the second processor complex 105b, the adapter card 110, and the RAID subsystems 115 of FIG. 7.

As the owner processor complex, the second processor complex 105b may communicate discovery communications 610 to the RAID subsystems 315. In addition, the setup module 410 modifies 540 the switch module 210 to logically disconnect the first processor module 110 from the adapter card 110. Thus although the first processor module 110 may communicate binary data such as random data to the adapter card 110, the adapter card 110 may not receive the communicated binary data.

The embodiment of the present invention performs a failover from the first processor complex 105a that owns the adapter card 110 to the second processor complex 105b. The present invention supports the continued use of the adapter card 110 when the first processor complex 105a fails.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus for adapter card failover, the apparatus comprising:
    a switch module comprising semiconductor logic and configured to logically connect a first processor complex to an adapter card through a first port as an owner processor complex, wherein the owner processor complex manages the adapter card except for a second port, receives error messages from the adapter card, and writes to setup registers of the adapter card, the setup registers storing written first data values that configure the switch module and the adapter card to communicate with the first processor complex as the owner processor complex, and the switch module further logically connects a second processor complex to the adapter card through the second port as a non-owner processor complex, wherein the non-owner processor complex manages the second port and writes to the setup registers of the adapter card;
    a detection module embodied in the second processor complex comprising semiconductor logic and software instructions executing on a processor and configured to detect a failure of the first processor complex; and
    a setup module comprising software instructions executing on a processor and configured to modify the switch module by writing second data values to the setup registers of the adapter card from the second processor complex through the second port to logically connect the second processor complex to the adapter card as the owner processor complex and to logically disconnect the first processor complex from the adapter card in response to detecting the failure.

2. The apparatus of claim 1, wherein the switch module is configured to identify the adapter card as an endpoint in response to a discovery command from the non-owner processor complex.

3. The apparatus of claim 1, wherein the switch module is configured to provide visibility to a device connected to the adapter card in response to a discovery command from the owner processor complex.

4. The apparatus of claim 1, wherein the owner processor complex communicates with a controller of the adapter card through the switch.

5. The apparatus of claim 1, wherein writing the second data values to the setup registers of the adapter card modifies the switch module to logically connect the second processor to the adapter card as the owner processor complex by switching the adapter card from using a control store of a first memory module to a control store of a second memory module.

6. The apparatus of claim 1, wherein the adapter card communicates with the first and second processor complexes using a Peripheral Component Interconnect Express (PCIe) interface.

7. The apparatus of claim 1, wherein the adapter card communicates with the first and second processor complexes using an interface selected from a Peripheral Component Interconnect Extended (PCI-X) interface and a Peripheral Component Interconnect (PCI) interface.

8. A system for adapter card failover, the system comprising:
    a first processor complex in communication with an adapter card;
    a second processor complex in communication with the adapter card and comprising a detection module configured to detect a failure of the first processor complex;
    the adapter card comprising
        a controller configured to manage the adapter card;
        a first memory module configured to store a control store comprising software instructions for the controller;
        a switch module comprising semiconductor logic and configured to logically connect the first processor complex to the adapter card through a first port as an owner processor complex, wherein the owner processor complex manages the adapter card except for a second port, receives error messages from the adapter card, and writes to setup registers of the adapter card, the setup registers storing written first data values that configure the switch module and the adapter card to communicate with the first processor complex as the owner processor complex, and the switch module further logically connects the second processor complex to the adapter card through the second port as a non-owner processor complex, wherein the non-owner processor complex manages the second port and writes to the setup registers of the adapter card;
    the second processor complex further comprising a setup module configured to modify the switch module by writing second data values to the setup registers of the adapter card from the second processor complex through the second port to logically connect the second processor complex to the adapter card as the owner processor complex and to logically disconnect the first processor complex from the adapter card in response to detecting the failure.

9. The system of claim 8, wherein the switch module is configured to identify the adapter card as an endpoint in response to a discovery command from the non-owner processor complex.

10. The system of claim 8, wherein the switch module is configured to provide visibility to a device connected to the adapter card in response to a discovery command from the owner processor complex.

11. The system of claim 8, wherein the owner processor complex communicates with the controller of the adapter card through the switch.

12. The system of claim 8, wherein writing the second data values to the setup registers oldie adapter card modifies the switch module to logically connect the second processor to the adapter card as the owner processor complex by switching the adapter card from using the control store of the first memory module to a control store of a second memory module.

13. The system of claim 8, wherein the adapter card communicates with the first and second processor complexes using a PCIe interface.

14. The system of claim 8, wherein the adapter card communicates with the first and second processor complexes using an interface selected from a PCI-X interface and a PCI interface.

15. The system of claim 8, wherein the adapter card is configured as an Ethernet controller.

16. The system of claim 8, wherein the adapter card is configured as a Redundant Array of Independent Disks (RAID) controller.

17. The system of claim 8, wherein the adapter card is configured as a storage area network controller.

18. A method performed by a processor useable medium having a processor readable program executed on a processor, the method comprising:
connecting a switch module of an adapter card to a first processor complex through a first port as an owner processor complex, wherein the owner processor complex manages the adapter card except for a second port, receives error messages from the adapter card and writes to setup registers of the adapter card, the setup registers storing written first data values that configure the switch module and the adapter card to communicate with the first processor complex as the owner processor complex;
connecting a second processor complex to the adapter card through the second port as a non-owner processor complex, wherein the non-owner processor complex manages the second port and writes to the setup registers of the adapter card;
detecting a failure of the first processor complex at the second processor complex; and
modifying the switch module by writing second data values to the setup registers of the adapter card from the second processor complex through the second port to logically connect the second processor complex to the adapter card as the owner processor complex and to logically disconnect the first processor complex from the adapter card in response to detecting the failure.

19. The method of claim 18, wherein the switch module is configured to identify the adapter card as an endpoint in response to a discovery command from the non-owner processor complex.

20. The method of claim 18, wherein the owner processor complex communicates with a controller of the adapter card through the switch.

21. The method of claim 18, wherein writing the second data values to the setup registers of the adapter cards connect the second processor to the adapter card as the owner processor complex by switching the adapter card from using a control store of a first memory module to a control store of a second memory module.

22. The method of claim 18, wherein the adapter card communicates with the first and second processor complexes using a PCIe interface.

23. The method of claim 18, wherein the adapter card communicates with the first and second processor complexes using an interface selected from a PCI-X interface and a PCI interface.

24. The apparatus of claim 5, wherein the owner processor complex initializes the adapter card, the adapter card is a RAID controller adapter card, the non-owner processor complex does not initialize the adapter card and does not receive error messages and status messages from the adapter card, the switch module identifies the adapter card as an endpoint in response to a discovery command from the non-owner processor complex and provides visibility to a device connected to the adapter card in response to a discovery command from the owner processor complex, and the detection module detects the failure of first processor complex if the first processor complex does not communicate with the adapter card during a specified time interval and the first processor complex does not respond to a subsequent query from the detection module.

25. The system of claim 12, wherein the owner processor complex initializes the adapter card, the adapter card is a RAID controller adapter card, the non-owner processor complex does not initialize the adapter card and does not receive error messages and status messages from the adapter card, the switch module identifies the adapter card as an endpoint in response to a discovery command from the non-owner processor complex and provides visibility to a device connected to the adapter card in response to a discovery command from the owner processor complex, and the detection module detects the failure of first processor complex if the first processor complex does not communicate with the adapter card during a specified time interval and the first processor complex does not respond to a subsequent query from the detection module.

26. The method of claim 21, wherein the owner processor complex initializes the adapter card, the adapter card is a RAID controller adapter card, the non-owner processor complex does not initialize the adapter card and does not receive error messages and status messages from the adapter card, the switch module identifies the adapter card as an endpoint in response to a discovery command from the non-owner processor complex and provides visibility to a device connected to the adapter card in response to a discovery command from the owner processor complex, and the failure of first processor complex is detected if the first processor complex does not communicate with the adapter card during a specified time interval and the first processor complex does not respond to a subsequent query from the second processor complex.

\* \* \* \* \*